US012705261B2

(12) United States Patent
Oara et al.

(10) Patent No.: US 12,705,261 B2
(45) Date of Patent: *Aug. 11, 2026

(54) SYSTEM AND METHOD FOR DETERMINING AND REPRESENTING A LINEAGE OF BUSINESS TERMS ACROSS MULTIPLE SOFTWARE APPLICATIONS

(71) Applicant: HATHA SYSTEMS, LLC, Washington, DC (US)

(72) Inventors: Ioan Mihai Oara, Raleigh, NC (US); Mikhail Bulyonkov, Novosibirsk (RU)

(73) Assignee: HATHA SYSTEMS, LLC, Washington, DC (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/503,907

(22) Filed: Nov. 7, 2023

(65) Prior Publication Data

US 2024/0296175 A1 Sep. 5, 2024

Related U.S. Application Data

(63) Continuation of application No. 17/701,548, filed on Mar. 22, 2022, now Pat. No. 11,836,166, which is a (Continued)

(51) Int. Cl.
*G06F 16/28* (2019.01)
*G06F 16/22* (2019.01)

(52) U.S. Cl.
CPC ........ *G06F 16/288* (2019.01); *G06F 16/2282* (2019.01)

(58) Field of Classification Search
CPC ........................... G06F 16/288; G06F 16/2282
(Continued)

(56) References Cited

U.S. PATENT DOCUMENTS 5,481,741 A 1/1996 McKaskle et al.
5,978,811 A 11/1999 Smiley
(Continued)

FOREIGN PATENT DOCUMENTS

EP 3588279 A1 1/2020
EP 3539022 B1 9/2021

OTHER PUBLICATIONS

Bose et al, "Lineage Retrieval for Scientific Data Processing: A Survey", ACM, pp. 1-28 (Year: 2005).*
(Continued)

*Primary Examiner* — Anil Khatri
(74) *Attorney, Agent, or Firm* — Nelson Mullins Riley & Scarborough LLP; Anthony A. Laurentano

(57) ABSTRACT

A system and method for determining the flow of one or more business terms between a plurality of software applications. The system includes extracting data from the source code data which includes a plurality of technical artifacts. An application model unit generates an application model that includes a representation of selected data components of the extracted data and generates application model data that includes data representative of a plurality of business terms and a plurality of technical artifacts. A term identification identifies the business terms and a mapping unit maps together the plurality of business terms and the plurality of technical artifacts from the application model data to form map data. A term lineage determination unit determines an inter-application lineage of the business terms based on the map data. The inter-application lineage is representative of data paths associated with the business term flowing between the software applications.

14 Claims, 9 Drawing Sheets

Related U.S. Application Data continuation-in-part of application No. 17/388,491, filed on Jul. 29, 2021, now Pat. No. 11,620,454, and a continuation-in-part of application No. 17/168,854, filed on Feb. 5, 2021, now Pat. No. 11,307,828, said application No. 17/388,491 is a continuation-in-part of application No. 17/168,859, filed on Feb. 5, 2021, now Pat. No. 11,348,049, and a continuation-in-part of application No. 17/168,854, filed on Feb. 5, 2021, now Pat. No. 11,307,828, said application No. 17/701,548 is a continuation-in-part of application No. 17/168,859, filed on Feb. 5, 2021, now Pat. No. 11,348,049, said application No. 17/168,854 is a continuation-in-part of application No. 17/013,130, filed on Sep. 4, 2020, now Pat. No. 11,288,043, said application No. 17/168,859 is a continuation-in-part of application No. 17/013,130, filed on Sep. 4, 2020, now Pat. No. 11,288,043, said application No. 17/701,548 is a continuation-in-part of application No. 17/013,130, filed on Sep. 4, 2020, now Pat. No. 11,288,043, said application No. 17/388,491 is a continuation-in-part of application No. 17/013,130, filed on Sep. 4, 2020, now Pat. No. 11,288,043.

(60) Provisional application No. 62/970,368, filed on Feb. 5, 2020, provisional application No. 62/970,466, filed on Feb. 5, 2020, provisional application No. 62/970,556, filed on Feb. 5, 2020.

(58) Field of Classification Search
USPC .......................................................... 707/743
See application file for complete search history.

(56) References Cited

U.S. PATENT DOCUMENTS 5,999,911 A 12/1999 Berg et al.
6,038,538 A 3/2000 Agrawal et al.
6,278,977 B1 8/2001 Agrawal et al.
6,308,224 B1 10/2001 Leymann et al.
6,598,219 B1 7/2003 Lau
6,615,258 B1 9/2003 Barry et al.
6,694,288 B2 2/2004 Smocha et al.
6,910,204 B1 6/2005 Rossomando
6,964,034 B1 11/2005 Snow
7,003,766 B1 2/2006 Hong
7,139,999 B2 11/2006 Bowman-Amuah
7,149,734 B2 12/2006 Carlson et al.
7,210,117 B2 4/2007 Kudukoli et al.
7,331,037 B2 2/2008 Dickey et al.
7,334,216 B2 2/2008 Molina-Moreno et al.
7,404,177 B1 7/2008 Greenfield et al.
7,448,022 B1 11/2008 Ram et al.
7,480,640 B1 1/2009 Elad et al.
7,606,782 B2 10/2009 Haley
7,631,006 B2 12/2009 Hagstrom et al.
7,640,251 B2 12/2009 Sundararajan et al.
7,702,605 B2 4/2010 Friedlander et al.
7,712,073 B1 5/2010 Srinivasan et al.
7,730,446 B2 6/2010 Anonsen et al.
7,792,783 B2 9/2010 Friedlander et al.
7,814,427 B2 10/2010 Cook et al.
7,877,421 B2 1/2011 Berger et al.
7,992,130 B2 8/2011 Bozza et al.
8,001,552 B1 8/2011 Chickneas
8,065,655 B1 11/2011 Deo et al.
8,065,658 B1 11/2011 Bali et al.
8,234,621 B2 7/2012 Killisperger et al.
8,250,099 B2 8/2012 Wilson et al.
8,271,943 B2 9/2012 Hudson, III
8,423,951 B1 4/2013 Koller
8,423,952 B2 4/2013 Bogl et al.
8,527,443 B2 9/2013 B'Far et al.
8,549,469 B2 10/2013 Bolarinwa
8,560,956 B2 10/2013 Curtis et al.
8,630,969 B2 1/2014 Ziegler
8,677,318 B2 3/2014 Mohindra et al.
8,719,773 B2 5/2014 Slone et al.
8,813,022 B2 8/2014 Rallapalli et al.
8,904,342 B2 12/2014 Bauder et al.
8,935,654 B2 1/2015 Sengupta et al.
8,984,490 B1 3/2015 Dahan
9,047,165 B1 6/2015 Mosterman
9,189,203 B1 11/2015 Hadar et al.
9,218,427 B1 * 12/2015 Thompson, III ........ G06F 16/86
9,256,485 B1 2/2016 Moore et al.
9,268,849 B2 2/2016 Siedlecki et al.
9,348,879 B2 5/2016 Mohammad et al.
9,400,637 B1 7/2016 Hadar et al.
9,436,760 B1 9/2016 Tacchi et al.
9,558,260 B1 1/2017 Halberstadt et al.
9,576,017 B2 2/2017 Kummer et al.
9,760,592 B2 9/2017 Huang et al.
9,940,222 B2 4/2018 Li et al.
9,953,279 B1 4/2018 Hankins et al.
9,965,252 B2 * 5/2018 Bera ......................... G06F 8/20
10,177,998 B2 * 1/2019 Parandehgheibi .. G06F 9/45558
10,338,901 B2 7/2019 Hernandez-Sherrington et al.
10,379,826 B1 8/2019 Klinger et al.
10,417,198 B1 9/2019 Simonelic, II et al.
10,452,366 B2 10/2019 Daniel et al.
10,635,566 B1 4/2020 Talluri et al.
10,678,522 B1 6/2020 Yerramreddy et al.
10,713,016 B1 7/2020 Shah et al.
10,768,909 B2 9/2020 Ramanathan
10,873,592 B1 * 12/2020 Singh .................. H04L 63/1425
10,885,440 B2 1/2021 Boyer et al.
11,144,289 B1 10/2021 Hwang et al.
11,244,364 B2 2/2022 Yu
11,288,043 B2 3/2022 Oara
11,307,828 B2 4/2022 Oara
11,314,489 B1 4/2022 Chartrand
11,314,707 B1 4/2022 Del Sordo
11,343,142 B1 5/2022 Wang et al.
11,348,049 B2 5/2022 Oara et al.
11,537,963 B2 12/2022 Hankins
11,556,510 B1 * 1/2023 Hanson ................. G06F 16/215
11,593,392 B2 2/2023 Portisch et al.
11,615,271 B2 3/2023 Zion et al.
11,620,454 B2 4/2023 Oara et al.
11,698,811 B1 7/2023 Tao et al.
11,755,958 B1 9/2023 Bhattarai et al.
11,832,416 B1 * 11/2023 Albright .............. H05K 7/1492
11,836,166 B2 * 12/2023 Oara .......................... G06F 8/34
11,853,313 B2 12/2023 Vasireddy
12,131,242 B1 * 10/2024 Nair ....................... G06N 3/045
12,210,839 B1 * 1/2025 Burton .................... G06F 40/30
12,314,150 B1 * 5/2025 Anumolu ............ G06F 11/3051
12,579,012 B2 * 3/2026 Mei ......................... G06F 9/522
2003/0171947 A1 9/2003 Ledford et al.
2004/0027388 A1 2/2004 Berg et al.
2004/0088197 A1 5/2004 Childress et al.
2004/0088678 A1 5/2004 Litoiu et al.
2007/0214166 A1 9/2007 Maeda et al.
2009/0171720 A1 7/2009 Crook et al.
2009/0241088 A1 9/2009 Dangeville et al.
2010/0058287 A1 3/2010 Sundararajan et al.
2012/0159427 A1 6/2012 Oara et al.
2012/0272205 A1 10/2012 Fox et al.
2013/0047090 A1 2/2013 Bhandarkar et al.
2013/0054627 A1 2/2013 Rausch et al.
2014/0282199 A1 9/2014 Basu et al.
2015/0012329 A1 1/2015 Prakash et al.
2015/0248203 A1 9/2015 Srivastava et al.
2015/0268955 A1 9/2015 Mehalingam et al.
2015/0363197 A1 12/2015 Carback, III et al.
2015/0363294 A1 12/2015 Carback, III et al.
2016/0313979 A1 10/2016 Hadar et al.
2017/0177309 A1 6/2017 Bar-Or et al.
2017/0270022 A1 * 9/2017 Moresmau ............ G06F 11/302
2018/0158235 A1 6/2018 Wu et al.

(56) References Cited

U.S. PATENT DOCUMENTS

| | | | |
|---|---|---|---|
| 2021/0240449 | A1 | 8/2021 | Oara |
| 2021/0240454 | A1 | 8/2021 | Oara |
| 2021/0241191 | A1 | 8/2021 | Oara |
| 2021/0357593 | A1 | 11/2021 | Oara et al. |
| 2022/0215043 | A1 | 7/2022 | Oara et al. |
| 2023/0351113 | A1 | 11/2023 | Oara et al. |

OTHER PUBLICATIONS

Parizek et al, " Data Lineage Analysis for Enterprise Applications by Manta: The Story of Java and C# Scanners", ACM, p. 1-11 (Year: 2024).*
Le et al, "Flash Extract: A Framework for Data Extraction by Examples", ACM, pp. 1-13 (Year: 2014).*
Laender et al, "Brief Survey of Web Data Extraction Tools", ACM, pp. 1-10 (Year: 2002).*
Mrunalini et al, "Simulating Secure Data Extraction in Extraction Transformation Loading (ETL) Processes", IEEE, pp. 1-6 (Year: 2009).*
Abi-Antoun et al, "Static Extraction and Conformance Analysis of Hierarchical Runtime Architectural Structure using Annotations," ACM, 321-340 (2009).
Aldrich et al, "Arch Java: Connecting Software Architecture to Implementation", ACM, pp. 187-197 (2002).
Alqahtani et al, "An Ontology-based Approach to Automate Tagging of Software Artifacts", IEEE, pp. 169-174 (2017).
Baumgartner et al, "Scalable Web Data Extraction for Online Market Intelligence", ACM, pp. 1512-1523 (2009).
Berger et al, "Extracting and Analyzing the Implemented Security Architecture of Business Applications", IEEE, 285-294 (2013).
Caron et al, "Business rule patterns and their application to process analytics", IEEE, pp. 13-20 (2013).
Chomngern. T. et al, Mobile Software Model for Web-Based Learning Using Information Flow Diagram (IFD), ACM 243-247 (2017).
Chourey et al, "Functional Flow Diagram(FFD): Semantics for Evolving Software", IEEE, pp. 2193-2199 (2016).
Chourey, V. et al, "Functional Flow Diagram(FFD): Semantics for Evolving Software", IEEE, 2016 Intl. Conference on Advances in Computing, Communications and Informatics (ICACCI), Sep. 21-24, 2016, Jaipur, India, 2193-2199 (2016).
Eijndhoven et al, "Achieving business process flexibility with business rules", IEEE, pp. 95-104 (2008).
Erol et al. "Combining BPM and social software: contradiction or chance?" Journal of software maintenance and evolution: research and practice 22.6-7 (2010): 449-476. Apr. 29, 2010 (Apr. 29, 2010) Retrieved on Mar. 27, 2021 (Mar. 27, 2021) from <https://onlinelibrary.wiley.com/doi/abs/10.1002/smr.460>.
European Search Report, EP 21750509, Jan. 8, 2024, 2 pages.
Fayyad, "The KDD Process for Extracting Useful Knowledge from vols. of Data", ACM, pp. 27-34 (1996).
Grigalis, "Towards Web-Scale Structured Web Data Extraction", ACM, p. 753-757 (2013).
Guo, "Automatic Transformation from Data Flow Diagram to Structure Chart", ACM, 44-49 (1997).
Handigund et al, "An Ameliorated Methodology for the Design of Panoptic Work Process Flow Diagram", IEEE, pp. 2052-2055 (2016).
Heer, J. et al, "Software Design Patterns for Information Visualization", IEEE, IEEE Transactions on Visualization and Computer Graphics, vol. 12, No. 5, Sep./Oct. 2006: 853-860 (2006).
International Preliminary Report on Patentabilty, PCT/US2021/016796, dated Jul. 28, 2022, 10 pages.
International Preliminary Report on Patentabilty, PCT/US2022/038674, dated Jan. 18, 2024, 5 pages.
International Search Report and Written Opinion, PCT/US2021/016795, dated May 4, 2021, 13 pages.
International Search Report and Written Opinion, PCT/US2021/016796, dated Apr. 23, 2021, 11 pages.
International Search Report and Written Opinion, PCT/US2021/016799, dated Apr. 15, 2021, 15 pages.
International Search Report and Written Opinion, PCT/US2022/038674, dated Dec. 14, 2022, 16 pages.
Ivkovic et al, "Tracing Evolution Changes of Software Artifacts through Model Synchronization", IEEE, pp. 1-10 (2004).
Leavens et al, "Formal Semantics for SA Style Data Flow Diagram Specification Languages", ACM, pp. 526-532 (1998).
Leon. "The future of computer-aided innovation." Computers in Industry 60.8 (2009): 539-550. Jun. 27, 2009 (Jun. 27, 2009) Retrieved on Mar. 28, 2021 (Mar. 28, 2021) from <https://www.sciencedirect.com/science/article/abs/Pii/S0166361509001286> entire document.
Leonhardt et al, "Integration of Existing Software Artifacts into a View- and Change-Driven Development Approach," ACM, pp. 17-24 (2015).
Liu et al, "A Process Data Extracting Method in Process Planning Knowledge discovery", IEEE, pp. 1-5 (2009).
Mefteh et al, "Implementation and Evaluation of an Approach for Extracting Feature Models from Documented UML Use Case Diagrams", ACM, 1602-1609 (2015).
Meng et al, "Transformation from Data Flow Diagram to UML2.0 Activity Diagram", IEEE, pp. 1010-1014 (2010).
Mitra et al, "Analyzing Business Systems comprised of Rules and Processes using Decision Diagrams", ACM, pp. 1-5 (2020).
Mitra, S. et al, "Analyzing Business Systems comprised of Rules and Processes using Decision Diagrams", 13th Innovations in Software Engineering Conference (formerly known as India Software Engineering Conference) (NEC 2020), Feb. 27-29, 2020, Jabalpur, India. ACM, New York, NY, USA, 5 pages ( 2020).
Robeer et al, "Automated Extraction of Conceptual Models from User Stories via NLP", IEEE, pp. 196-205 (2016).
Sangal et al, "Using Dependency Models to Manage Complex Software Architecture", ACM, 167-176 (2005).
Schre et al, "The Decision-Scope Approach to Specialization of Business Rules: Application in Business Process Modeling and Data Warehousing," ACM, pp. 3-18 (2013).
Sharma et al, "Extracting High-Level Functional Design from Software Requirements", IEEE, 35-42 (2009).
Su et al., "Leveraging Usage Data of Software Architecture Artefacts", IEEE, pp. 13-21 (2019).
Surekha et al, "A Rapid Application Development Framework for Rule-Based Named-Entity Extraction", ACM, pp. 1-4 (2009).
Tan et al, "A col. Level Data Lineage Processing System Based on Hive", ACM, 47-52 (2020).
Van Eijndhoven, T. et al, "Achieving business process flexibility with business rules", IEEE, 12th International IEEE Enterprise Distributed Object Computing Conference, pp. 95-104 (2008).
Ward, "The Transformation Schema: An Extension of the Data Flow Diagram to Represent Control and Timing," IEEE, pp. 198-210 (1986).
Weichselbraun et al, "Mitigating linked data quality issues in knowledge-intense information extraction methods", ACM, pp. 1-12 (2017).
Woodruff et al, "Supporting Fine-Grained Data Lineage in a Database Visualization Environment", IEEE, pp. 91-102 (1997).
Chaparro et al, "Towards the Automatic Extraction of Structural Business Rules from Legacy Databases", IEEE, pp. 479-488 (2012).
Chittimalli et al, "BuRRiTo: A Framework to Extract, Specify, Verify and Analyze Business Rules", IEEE, pp. 1190-1193 (2019).
International Preliminary Report on Patentabilty, PCT/US2023/064794, dated Sep. 24, 2024, 9 pages.
Lin et al, "Research on Extracting Risk Control Rules for Internet of Things Business", IEEE, pp. 598-601 (2018).
Van der Walt et al, "Data Migration in Support of Business Intelligence in a Growing Organization", IEEE, pp. 1-9 (2021).
Extended European Search Report, EP Application No. 22850315.7, dated May 19, 2025, 10 pages.

* cited by examiner

40

| Application | Software Object Type | Software Object Name | Business Term |
|---|---|---|---|
| Application A | Program | PA1 | Term 1 |
| Application A | Program | PA1 | Term 2 |
| Application A | Program | PA2 | Term 3 |
| Application B | Program | PA1 | Term 1 |
| Application B | Program | PA1 | Term 2 |
| Application B | Program | PB3 | Term 3 |
| Application B | Program | PB4 | Term 5 |

| Application | Software Object Type | Software Object Name | Business Term |
| --- | --- | --- | --- |
| Application A | Table | PA1 | Term 1 |
| Application A | Table | PA1 | Term 2 |
| Application A | Table | PA2 | Term 3 |
| Application B | Table | PA1 | Term 1 |
| Application B | Table | PA1 | Term 2 |
| Application B | Table | PB3 | Term 3 |
| Application B | Table | PB4 | Term 5 |

SYSTEM AND METHOD FOR DETERMINING AND REPRESENTING A LINEAGE OF BUSINESS TERMS ACROSS MULTIPLE SOFTWARE APPLICATIONS

RELATED APPLICATIONS

This Application is a Continuation of application Ser. No. 17/701,548 filed Mar. 22, 2022, which is a Continuation-in-part of application Ser. No. 17/013,130 filed on Sep. 4, 2020, now U.S. Pat. No. 11,288,043. application Ser. No. 17/701,548 is a Continuation-in-part of application Ser. No. 17/168,854 filed on Feb. 5, 2021, now U.S. Pat. No. 11,307,828. application Ser. No. 17/701,548 is a Continuation-in-part of application Ser. No. 17/388,491 filed on Jul. 29, 2021, now U.S. Pat. No. 11,620,454. application Ser. No. 17/701,548 is a Continuation-in-part of application Ser. No. 17/168,859 filed on Feb. 5, 2021, now U.S. Pat. No. 11,348,049. application Ser. No. 17/388,491, now U.S. Pat. No. 11,620,454, is a Continuation-in-part of application Ser. No. 17/168,854 filed on Feb. 5, 2021, now U.S. Pat. No. 11,307,828. application Ser. No. 17/388,491 is a Continuation-in-part of application Ser. No. 17/013,130 filed on Sep. 4, 2020, now U.S. Pat. No. 11,288,043. application Ser. No. 17/388,491, now U.S. Pat. No. 11,620,454, is a Continuation-in-part of application Ser. No. 17/168,859 filed on Feb. 5, 2021, now U.S. Pat. No. 11,348,049. application Ser. No. 17/168,859, now U.S. Pat. No. 11,348,049, is a Continuation-in-part of application Ser. No. 17/013,130 filed on Sep. 4, 2020, now U.S. Pat. No. 11,288,043. application Ser. No. 17/168,854, now U.S. Pat. No. 11,307,828, is a Continuation-in-part of application Ser. No. 17/013,130 filed on Sep. 4, 2020, now U.S. Pat. No. 11,288,043. application Ser. No. 17/013,130, now U.S. Pat. No. 11,288,043, claims the benefit of U.S. Provisional Application 62/970,556 filed on Feb. 5, 2020. application Ser. No. 17/013,130, now U.S. Pat. No. 11,288,043, claims the benefit of U.S. Provisional Application 62/970,368 filed on Feb. 5, 2020. Application Ser. No. 17/013,130, now U.S. Pat. No. 11,288,043, claims the benefit of U.S. Provisional Application 62/970,466 filed on Feb. 5, 2020. The entire contents of these applications are incorporated herein by reference in their entirety.

BACKGROUND OF THE INVENTION

The present invention is related to identifying common terms across multiple different software applications that exchange data, and is specifically related to the identification of business terms across multiple different software applications and the exchange of data representing the business terms.

When analyzing existing software applications in an organization's portfolio of applications, the question of which data is being shared or is moving between the applications is important to know. As is known, data typically is not expressed or identified in the same way, such as in fields or columns, in different software applications as the same data may be identified using different names therein. For example, a product identification may appear as the field ProdID in one software application and as ProductIdentifier in another software application. As such, identifying the same data in different software applications can be highly problematic and poses significant challenges.

Further, in the context of an audit of existing software applications, an analyst may want to know how the data that is being collected and consolidated in, for example, general ledger tables. Data in the general ledger table may be collected from multiple different software applications, and hence there is a need to find the same data in each of the applications. The user may find, for example, that the relevant information is not being properly collected from a software application associated with revenue generation, and thus the information in the general ledger is incomplete.

In the context of software application modernization, if one software application is modernized or rewritten or replaced, it is important to know in advance which data is being collected by the application and which data is being provided to the other software applications. In the absence of this information, the links and data feeds between the software applications are broken. For example, if a first application offers one or more programming interfaces (APIs) to be used by a second application, then a modernization project needs to ensure that the same APIs are being offered, or, alternatively, once the interfaces are offered, that the second application adapts to any new functionality associated with the new software and hence can effectively communicate with the first application.

SUMMARY OF THE INVENTION

The present invention is directed to a system and method for identifying the paths or connections (i.e., term lineage) through which the values of business terms move or flow through multiple different software applications. The term lineage identification system of the present invention identifies the business terms from a data model extracted from data such as source code, and then the business terms are mapped to selected software artifacts. The system can then generate or create a term lineage diagram so as to discover and view the term lineage of the selected business terms.

The system and method of the present invention can be configured for identifying or determining the paths through which business terms and the values associated therewith move or flow between multiple different software applications. The system identifies the business terms by first detecting the fields that appear in selected software artifacts associated with each of the software applications under analysis, such as programs or data stores, since the fields oftentimes include the business terms. The system can allow for the selection of a business term or a group of business terms and the system can automatically identify and locate the application interfaces (e.g., programs) which include or incorporate the business terms. The system can then construct a matrix or a diagram, which can show or represent one or more intersections between different software applications, and which can correspond to the application interfaces between the software applications. The business terms can appear in each of the interfaces and therefore flow between the different software applications.

The present invention is directed to a system for determining the flow of one or more business terms between a plurality of software applications. The system includes a data source for storing source code data associated with the software application and a data extraction unit for extracting data from the source code data to form extracted data. The extracted data also includes a plurality of technical artifacts. The system further includes an application model unit for generating an application model that includes a representation of selected data components of the extracted data and for generating application model data from the application model. The application model data includes data representative of a plurality of business terms and a plurality of technical artifacts. Still further, the system includes a term identification unit for identifying the plurality of business terms from the application model data where each of the plurality of business terms includes business related data, and a mapping unit for mapping together in a multi-dimensional table the plurality of business terms and the plurality of technical artifacts from the application model data to form map data. The system still further includes a term lineage determination unit for determining an inter-application lineage of one or more of the plurality of business terms based on the map data, wherein the inter-application lineage is representative of one or more data paths associated with one or more of the plurality of business term flowing between the plurality of software applications.

The plurality of software artifacts form one or more application interfaces for allowing the business terms to flow between the plurality of software applications. The application interfaces include one or more programs.

The term identification unit identifies selected ones of the data components in the application model data, organizes the data components into a plurality of groups in which all elements of a group refer to the same concept, and associates each of the plurality of groups with one or more of the plurality of business terms. The mapping unit maps together the plurality of business terms with the plurality of software artifacts from the application model data that implements the business terms to establish a relationship therebetween. The mapping unit also maps together the plurality of business terms and the plurality of software artifacts from the application model data for each of the plurality of software applications to form a map for each of the plurality of software applications. Further, each one of the maps includes a table that tabulates the plurality of business terms and the plurality of software artifacts. The mapping unit is configured to combine the map for each of the plurality of software applications to create a combined map.

The system can also include a storage unit for storing the extracted data and for providing the extracted data to the application model unit. The storage unit includes a database for storing the extracted data and a knowledge repository for storing selected information about the software application. The representation of the selected data components of the application model includes entities, relationships and associated attributes that describe a functionality of the data components in connection with each of the plurality of software applications. Further, the entities include programs, classes, statements, data elements, tables, columns, or screens, and wherein the attributes include associated identifying information that further specify the entity.

The system can also include a user interface generator for generating a user interface for displaying a list of the business terms or a list of the software artifacts that implement the business terms. The term lineage determination unit can determine from the map data an inter-application lineage of one or more of the business terms based on the mapping between the business term data and the software object data in the map.

The present application is also directed to a computer implemented method performed by at least one computer processor for determining the flow of one or more business terms between a plurality of software applications, where the method includes executing a computer program having instructions that, when executed by the computer processor, configure the processor for extracting data from source code data associated with the plurality of software applications to form extracted data, wherein the extracted data also includes a plurality of technical artifacts; generating an application model that includes a representation of selected data components of the extracted data and for generating application model data from the application model, wherein the application model data includes data representative of a plurality of business terms and the plurality of technical artifacts; identifying the plurality of business terms from the application model data, wherein each of the plurality of business terms includes business related data; mapping together in a multi-dimensional table the plurality of business terms and the plurality of technical artifacts from the application model data to form map data; and determining an inter-application lineage of one or more of the plurality of business terms based on the map data, wherein the inter-application lineage is representative of one or more data paths associated with one or more of the plurality of business term flowing between the plurality of software applications. The plurality of technical artifacts form one or more application interfaces for allowing the business terms to flow between the plurality of software applications, and the application interfaces comprises one or more programs.

The method can also include identifying selected ones of the data components in the application model data, organizing the data components into a plurality of groups in which all elements of a group refer to the same concept, and associating each of the plurality of groups with one or more of the plurality of business terms. Further, the mapping together can include mapping together the plurality of business terms with the plurality of software artifacts from the application model data that implements the business terms to establish a relationship therebetween, and mapping together the plurality of business terms and the plurality of software artifacts from the application model data for each of the plurality of software applications to form a map for each of the plurality of software applications. Each one of the maps includes a table that tabulates the plurality of business terms and the plurality of software artifacts. Still further, the method can include combining the map for each of the plurality of software applications to create a combined map.

The method of the present invention also includes determining from the map data an inter-application lineage of one or more of the business terms based on the mapping between the business term data and the software object data in the map, and generating a user interface for displaying a list of the business terms or a list of the software artifacts that implement the business terms.

The present application is also directed to a computer readable medium comprising computer program instructions tangibly stored on the computer readable medium, wherein the computer program instructions are executable by at least one computer processor to perform a method, the method comprising executing a computer program having instructions that, when executed by the computer processor, configure the processor for extracting data from source code data associated with the plurality of software applications to form extracted data, wherein the extracted data also includes a plurality of technical artifacts; generating an application model that includes a representation of selected data components of the extracted data and for generating application model data from the application model, wherein the application model data includes data representative of a plurality of business terms and the plurality of technical artifacts; identifying the plurality of business terms from the application model data, wherein each of the plurality of business terms includes business related data; mapping together in a multi-dimensional table the plurality of business terms and the plurality of technical artifacts from the application model data to form map data; and determining an inter-application lineage of one or more of the plurality of business terms based on the map data, wherein the inter-application lineage is representative of one or more data paths associated with one or more of the plurality of business term flowing between the plurality of software applications. The plurality of technical artifacts form one or more application interfaces for allowing the business terms to flow between the plurality of software applications, and the application interfaces comprises one or more programs.

The computer readable medium can also include instructions for identifying selected ones of the data components in the application model data, organizing the data components into a plurality of groups in which all elements of a group refer to the same concept, and associating each of the plurality of groups with one or more of the plurality of business terms. Further, the mapping together can include mapping together the plurality of business terms with the plurality of software artifacts from the application model data that implements the business terms to establish a relationship therebetween, and mapping together the plurality of business terms and the plurality of software artifacts from the application model data for each of the plurality of software applications to form a map for each of the plurality of software applications. Each one of the maps includes a table that tabulates the plurality of business terms and the plurality of software artifacts. Still further, the computer readable medium can include instructions for combining the map for each of the plurality of software applications to create a combined map.

The computer readable medium of the present invention also includes instructions for determining from the map data an inter-application lineage of one or more of the business terms based on the mapping between the business term data and the software object data in the map, and generating a user interface for displaying a list of the business terms or a list of the software artifacts that implement the business terms.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIGS. 2 and 3 are schematic representations of the tables that include mapping data generated by the mapping unit of the term lineage identification system of FIG. 1 according to the teachings of the present invention.

DETAILED DESCRIPTION

Figure 1:
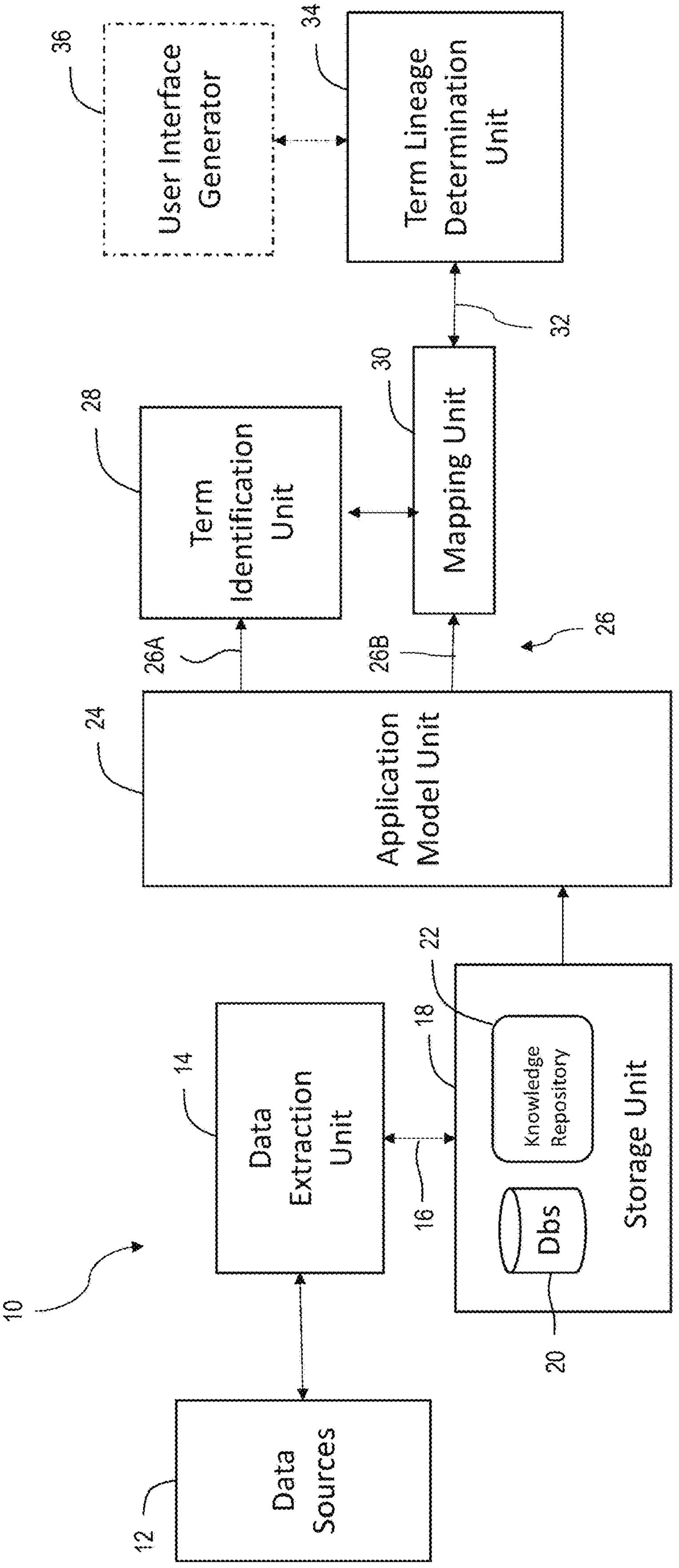
FIG. 1 is a schematic block diagram of the term lineage identification system according to the teachings of the present invention.

The present invention is directed to a term lineage identification system and associated method for identifying or determining the paths through which selected terms, such as business terms, move between or exist in multiple different software applications according to the teachings of the present invention. The term lineage identification system of the present invention identifies the business terms from a data model extracted from source code. The system then selects one or more business terms that form part of a term lineage project, and based on the selection, generates or creates a term lineage diagram so as to discover and view the term lineage of the selected business terms.

The term "operator" is used to designate the human or end user who is utilizing the system and the method of the present invention.

The term "end user" is used to designate a user of the target application or another software application.

The term "software artifact" or "technical artifact" is intended to include an object which plays a role in the architecture and the running of a software application, such as a user interface (e.g., a screen or a window), a program or a data store. Software artifacts are defined by the developers of the software application such that, at runtime, the artifacts combine to support the functionality of the application. In different types of technologies, the program may also be called functions, procedures, or methods.

The term "user interface" as used herein refers to any software artifact in a software application, which is used to present data to an operator or end user or acquire data from an operator or end user. The user interfaces can include screens, windows, panes, forms, pages or reports.

The term "data store" as used herein is intended to include any physical or logical device which holds or stores data, including data processed by the software application. The data stores can include tables, records, segments, indexed or sequential files, and the like.

The term "program" as used herein refers to a sequence of instructions, stored in any medium, that can be interpreted and executed by a computer to perform a specific task, and can refer to either the executable form that a computer can execute (e.g., executable code) or the human readable form (e.g., source code).

The term "application" or "software application" as used herein is intended to include a group of software artifacts which together combine to create the functionality required to run the operation of a computer system for the benefit of an end user or an organization. The application can have associated source code which can be programmatically called or can programmatically call other such procedural calls or that can communicate with a software artifact.

The term "application interface" or "application programming interface" as used herein is intended to mean a computing interface that defines interactions between two or more software applications. The application interface can define the types of calls or requests that can be made, how to make them, the data formats that can be used, the conventions to follow, and the like. The interface can also provide extension mechanisms so that users can extend existing functionality in various ways and to varying degrees. The interface can be entirely custom, specific to a component, or can be designed based on an applicable industry-standard to ensure interoperability between software applications. The interface can also allow software artifacts to be shared between two or more software applications. One example of an interface is when a software application offers an application programming interface (API) that includes one or more software programs which can be invoked by other applications in order to gain access to selected data or functions. By way of example, a logistical application called Parts may hold an inventory of available parts, and offer a program called PartList which supplies another Shipping application with the list parts available for shipping, including their locations and prices. In this case, the PartsList program is an application interface. Another example is when the Parts application holds the inventory of parts in a table called PartsTable and allows the Shipping application to read this table directly, without the use of a shared program. In this case, the Parts Table is an application interface.

The term "application model" as used herein is intended to mean or include a data model consisting of entities, relationships and their associated attributes, collected through an extraction process (e.g., a reverse engineering process) and stored in selected memory or storage (e.g., files or a database). The entities can include programs, classes, statements, data elements, tables, columns, or screens. The attributes can include for example any associated identifying information, such as name, size, identification (ID) or kind that can further specify each entity. The entities may be related through relationships such as statement reads field, program updates table, program calls, and the like.

The term "business term" as used herein is intended to mean or include an abstract piece or portion of data which is representative of a term that has a business related significance. Examples of business terms can include, without limitation, words, groups of words, phonemes, acronyms, partial words, or associated grouping or collection of letters, numbers and/or symbols. By simple way of example, the business terms can include in a transaction context, without limitation and for illustrative purposes, terms such as Transaction Date, Unit Price, Vendor Name or Customer Social Security Number. While business terms are by their nature abstract and conceptual, they are embodied in the software application in the form of data elements, such as fields or members in a program or a user interface or columns in a table. Thus, a single business term may be implemented throughout or located in many different fields or members or columns, and can have the same or different names. While intimately related to the data elements which appear in the application, a business term is not by itself construed to have a software connotation. The data elements which appear in the target application may embody or implement various business terms. Thus, data represented by a single business term may be implemented through or located in many different fields or members or data stores, and can have the same, similar, or different names. For example, in a common business-oriented language (COBOL) application, the term Transaction Date may appear to be implemented in a field called TRANSACTION-DATE, or TRANS-DT or TRANSDTI. The system and method of the present invention can not only locate the terms that are being used, but can also determine where the terms are being implemented throughout the application. Further, the application code may use many other types of data elements which are not necessarily business terms, such as for example fields which can be used as indexes or as switches to control the execution of one or more programs.

The term "term lineage" or "lineage" as used herein refers to the data paths on which data representing business terms moves or flows between different software applications. By way of example and without limitation, a term called "Product ID" can move or flow between different software applications, such as for example between an Inventory application and an Orders application, or between the Inventory application and a Shipping application. Another term, "Order Number" may move between the Orders and Shipping applications. As such, the lineage of the business term is representative of the communication history between various software artifacts between different software applications.

The term "term lineage diagram" is a representation or diagram illustrating or displaying or conveying information or relationships associated with one or more term lineages in the form of a diagram, in which for example programmatic boxes can correspond to software artifacts and the edges or connections can correspond to flows of data therebetween.

The term lineage identification system 10 of the present invention is shown for example in FIG. 1. The illustrated term lineage identification system 10 can employ a computing system or one or more electronic devices that has one or more units, modules, systems, or sub-systems that are configured to implement the functionality of the present invention. According to the present invention, the term lineage identification system 10 helps identify the path or flow of selected data, such data or values associated with business terms and business rules, between multiple different software application. The system 10 can also be configured to generate or create a term lineage diagram. The illustrated term lineage identification system 10 includes one or more data sources 12 for storing source code that is associated with different software applications, such as for example program source code or database or screen descriptions. The data extraction unit 14 can acquire or extract selected types of information or data from the source code. More specifically, the data extraction unit 14 can identify, capture or extract data 16, which can include for example software artifacts which includes user interfaces, programs and data stores, as well as entities which includes for example tables and data elements, and attributes, used by the one or more software applications, as well as the relationships between the applications, such as programs calling programs or programs selecting data from tables and the like. According to one embodiment of the present invention, the data extraction unit 14 extracts the types of data that allows the system 10 to subsequently identify, determine and represent data representative of business terms, as well as the relationship between the software artifacts. The data extraction unit 14 can be implemented using known reverse engineering methods, such as for example by using software analysis tools, and preferably software static analysis tools. Examples of suitable software static analysis tools includes Apache Yetus, Axivion Bauhaus, Coverity, and the like. Further, one of ordinary skill in the art will readily recognize that the data source 12 can comprise multiple data sources for providing data to the system 10.

The extracted data 16 can be stored in a storage unit 18. The storage unit 18 can be any selected type of storage unit 18 as is known in the art. According to one practice, the storage unit 18 can include a database 20 for storing the extracted data 16. The database 20 can be any selected type of database, and is preferably a relational database. The database 20 functions as a storage device for a knowledge repository 22, which can be implemented in connection with (e.g., on top of) the database, and which can be configured to also store the extracted data 16, such as for example data about the software artifacts, data elements and program statements, and their attributes and relationships. Consequently, the knowledge repository 22 can be used to store and make available for retrieval information associated with and about the software applications. In particular, the knowledge repository 22 stores information about which statements appear in each application or program, which data elements are used in each statement, which data elements and which scripts appear on each user interface, which columns or fields appear in which data stores, which procedures are triggered by operations against tables, which programs call which programs, which programs communicate with which user interfaces, which programs access which data stores, and the like.

The term lineage identification system 10 also includes an application model unit 24 for creating an application model that includes all of the extracted data, which includes software artifacts, entities, relationships and associated attributes. As such, the application model can be employed as a convenient source of information about the software applications being analyzed by the system of the present invention. The entities can include programs, classes, statements, data elements, tables, columns, or screens. The attributes can include for example any associated identifying information that can further specify the entity. The entities may be related through relationships such as statement read fields, program update tables, programmatic calls, and the like. The application model unit 24 can generate application model data or information 26 that is indicative or representative of the application model that is conveyed to other portions of the system. The application model information 26 can include information or data associated with the business terms and software artifacts.

The term lineage identification system 10 of the present invention can also include a term identification unit 28 which uses information in the model information 26A from the application model unit 24 and then searches and identifies therefrom data representative of one or more business terms based on a system or an operator search request. Specifically, the information stored in the knowledge repository 22 is employed by the term identification unit 28 for identifying the business terms. The term identification unit 28 identifies the data elements in the model information 26A that corresponds to each software application, organizes the data elements into groups in which all elements refer to the same or similar concept, and associates each group with a business term. By way of a simple example, in a common business-oriented language (COBOL) application, the data elements or fields CUSTOMER-NAME, CUST-NAME, CNAME and CUSTN may refer to the same concept of a customer name. Therefore, a business term can be derived and named (e.g., customer name) from the foregoing data elements, and the system can generate implementation relationships to each one of the different fields corresponding to the business term.

The identified business terms are then mapped via the mapping unit 30 to the software artifacts in the model information 26B. According to the present invention, the application or data model is created from the source code data by the application model unit 24 for each software application. The application model includes information or data associated with both the software artifacts and the business terms. The term identification unit 28 identifies the data associated with or representative of selected business terms. The mapping unit 30 then maps the business terms or business term data to the software artifacts. This process is repeated for each software application present in the data sources 12 until the processing is completed. Since each business term can have multiple implementations which appear in various different programs or data stores, the term lineage identification system 10 can identify each business term and any associated implementation and then determine to which software artifact the business term should be mapped. This process establishes the relationships between each business term and the corresponding software artifact. Such a mapping is established for each of the software applications, and then the mapping unit 30 can generate a table setting forth the business terms and associated or related software artifacts.

The term lineage identification system 10 further includes a term lineage determination unit 34 for determining from the mapped data 32 the inter-application lineage of one or more business terms based on the mapping between the business terms and the software artifacts. The system 10 of the present invention initially determines which software artifacts are shared between applications, and then the artifacts are designated as application interfaces. For each identified application interface, the mapping unit 30 then maps each software artifact or application interface to one or more business terms so as to determine which business terms appear in the application interface. By way of a simple example, Application A has a program PA1, which uses the business terms BT1 and BT2. The program PA1 is provided to other applications as an API and another different application, Application B, can initiate a call operation to Application A to accomplish a selected task. The system 10 determines the values for the terms BT1 and BT2 to pass from Application A to Application B, therefore establishing a term lineage (e.g., a data path or communication history) between the two software applications. Such data lineages may continue with regard to other applications. Thus, Application B can store the values of the terms BT1 and BT2 in any suitable format, such as for example in tabular form, which can be made available to another application, such as for example to Application C. The system of the present invention can then determine that there is a lineage that starts from Application A, to Application B, and then to Application C.

The data identification system 10 can also include an optional display unit having a user interface generator 36 for generating and then displaying a user interface. The user interface displays results and allows the operator to make selections, such as selecting business terms. The operator can interact with the user interface and can select using conventional selection mechanisms (e.g., mouse, keyboard, etc.) one or more user selectable features of the present invention. For example, when the operator desires to create a term lineage analysis project, then the user can for example display a list of applications to which the project pertains. Once the project is created, the operator can select one or more business terms and then determine the lineage of the selected business terms.

FIGS. 2 and 3 illustrate the mapping operation that occurs within or performed by the mapping unit 30 according to the teachings of the present invention. As business terms are identified by the term identification unit 30, a mapping is created between the business terms and the software artifacts of interest. The mapping unit 30 can map the business term data received from the term identification unit 28 to the software artifact data in the model data 26B of the application model unit 24, and consolidate the information in any suitable format, such as for example in a table 40. As shown for example in FIG. 2, the illustrated table 40 can have any selected number and arrangement of columns 42 and rows 44. In the illustrated table 40, for example, the columns 42 can include an application column 42A, a software artifact type column 42B, a software artifact name column 42C, and a business term column 42D. The rows 44 illustrate the type of software artifact and the presence or occurrence of the artifact in a selected application under consideration, as well as the business terms that are implemented in or by the software artifact. The rows 44 can include a title row 44A, as well as other rows. For example, the rows 44B-44D identify that Application A includes a program (e.g., software artifact) named PA1 that includes selected business terms (e.g., Term 1 and Term 2), as well as a program PA2 that includes Term 3. Likewise, rows 44E-44H identify that a second application, Application B, also includes the common program PA1 that includes the common business terms, Term 1 and Term 2. The Application B also includes program PB3 that includes Term 3 as well as program PB4 that includes Term 5. The mapping unit 30 can generate a table for each of the applications under analysis, and the various mappings can be joined together resulting in the combined table 40. For example, the portion of the table 40 associated with Application A can be a first table generated by the mapping unit 30, and the portion of the table 40 associated with Application B can be a second table generated by the mapping unit 30. The two table portions can be combined by the mapping unit 30 to form the single aggregated or resultant table 40.

The table 40 generated by the mapping unit 30 shows that the program PA1 is shared by the Applications A and B, and as such the program can be designated as an application interface. The program can thus be used to pass data between the applications. At the same time, program PA1 operates on the business terms Term 1 and Term 2 such that the system can determine that the data representing the two business terms is passed between the two applications. Since the business terms Term 1 and Term 2 are shared terms, they can optionally be highlighted in the table 40. As a counterexample, programs PA2, PB3 and PB4 are not shared between the applications. Therefore, the programs are not deemed to be application interfaces and thus they do not contribute to the inter-application term lineage. Since each business term has multiple implementations that appear in various programs or data stores, the system 10 can identify each business term, find the implementation of the term in the various software applications and then determine the software artifact to which it belongs, thus establishing the relationships between the business term and the corresponding software artifacts. FIG. 3 also illustrates a Table 40A that is similar to table 40, except that the software object in column 42B is a table rather than a program. The table 40A also includes columns 42 and rows 44. As such, the system 10 can determine the business terms that are shared between Application A and Application B and which reside in the various tables.

Figure 4:
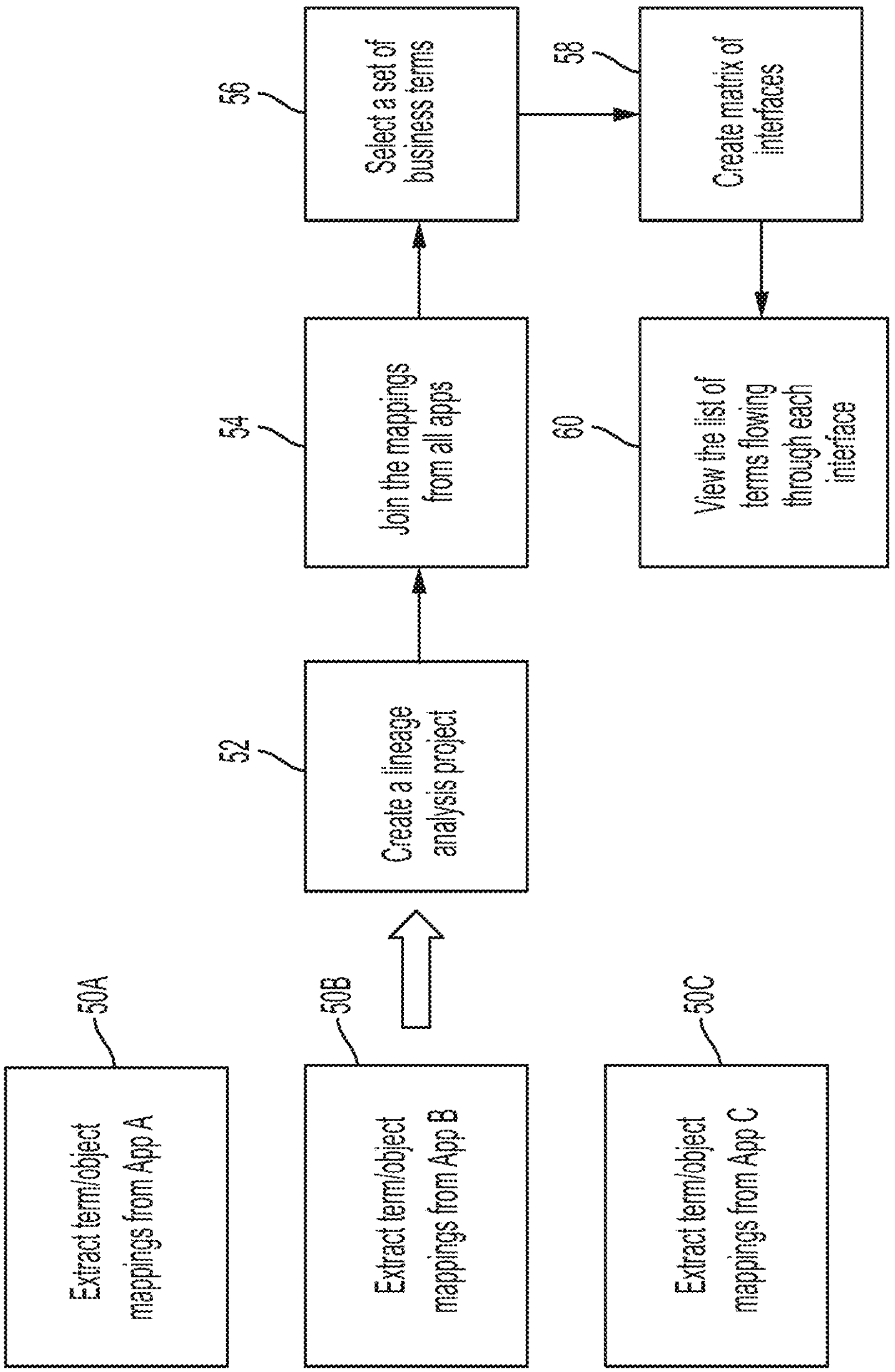
FIG. 4 is a schematic flow chart diagram illustrating the creation of a term lineage analysis project by an operator according to the teachings of the present invention.

FIG. 4 is a schematic flow chart diagram illustrating the steps taken by an operator of the term lineage identification system 10 in order to identify and view the inter-application lineages of selected business terms of interest and view possible inter-application term lineages. As shown, the term lineage identification system 10 of the present invention includes a data extraction unit 14 for extracting selected types of data from the source data, such as for example software objects, entities, attributes, and relationships associated with the artifacts, and data representative of business terms. The term identification unit 28 identifies selected terms, such as business terms, present within the extracted data 16 and associated with the selected application. The identified terms and software artifacts associated with application A are collated and mapped relative to each other by the mapping unit 30, step 50A. This process is repeated for application B (step 50B) and for application C (step 50C), until all applications have been examined and the necessary source data is extracted. The operator can then create or initiate via the user interface generator 36 a term lineage analysis project, step 52, as shown for example in FIGS. 1 and 5. The mapping unit 30 can map the software artifacts from the model data 26B to the business terms from the model data 26A, and can represent the mapped data in any selected format, including for example in a table format. The mapping unit 30 can also be configured to collate, connect or join together the tables generated by the mapping unit 30 for the various applications into a single aggregated table, such as shown for example in FIGS. 2 and 3, step 54. The mapped software artifact and business term information from the mapping unit 30 is then employed in the term lineage project, so as to allow the operator access to the list of business terms and associated software artifacts. The operator can then select one or more business terms of interest to determine the specific applications that employ the terms, step 56. The business terms can be displayed to the user in any selected form or format, such as for example, in a list form, FIG. 6. The term lineage determination unit 34 can determine the lineage of selected business terms from the mapped data 32, and specifically can create or generate a matrix of the terms and the application interfaces, step 58. An example of the matrix generated or created by the term lineage determination unit 34 is shown for example in FIG. 6. The operator can then select the intersection of two applications and view the application interfaces and the associated business terms, step 60.

Figure 5:
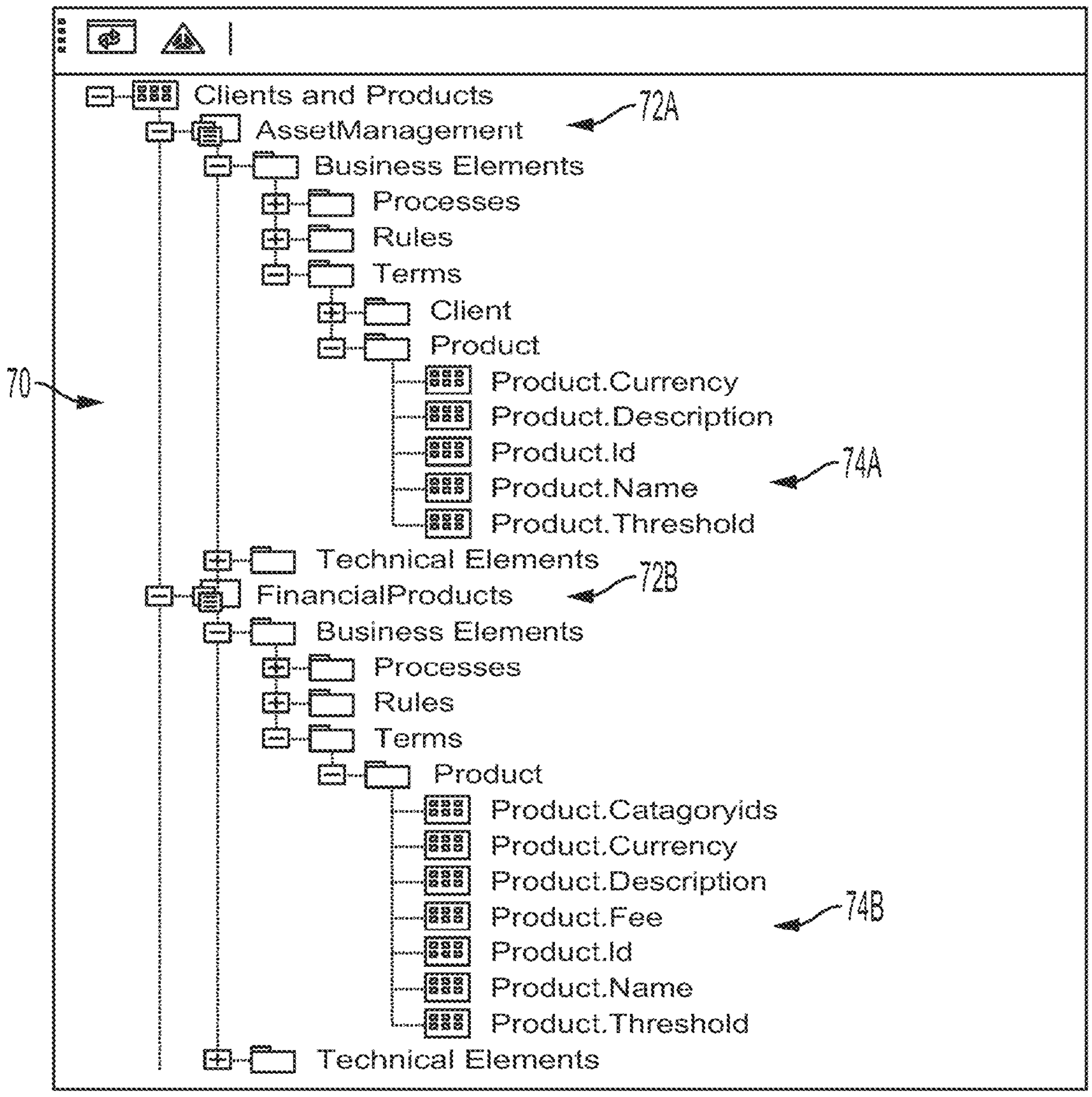
FIG. 5 is a schematic representation of a user interface displaying in a tree-structure the software applications and associated business terms as part of a lineage analysis project according to the teachings of the present invention.

FIG. 5 is a schematic representation of a selected user interface 70 generated by the system 10 according to the teachings of the present invention. More specifically, the illustrated user interface 70 can be generated by the term lineage determination unit 34 or by the user interface generator 36 when an operator desires to initiate a term lineage analysis project. The illustrated user interface 70 can be displayed to the operator and can include the identification of selected software applications and associated business terms. The information can be displayed or presented in any selected format, such as for example in list form or in a tree-like structure. According to one illustrative example, the displayed information can include application data including for example information associated with an application, such as the application Asset Management 72A and the application Financial Products 72B. The applications 72A, 72B can have associated therewith selected business terms. For example, the application 72A can have the business terms 74A associated therewith and set forth in a list format, and the application 72B can have the business terms 74B associated therewith and also set forth in a list format. The operator can create from the user interface 70 the term lineage analysis project by selecting one or more of the listed business terms. As a result of the displayed information, the operator can gain insights into the lineage of each of the applications, including the list of business terms which appear in each of them.

Figure 6A:
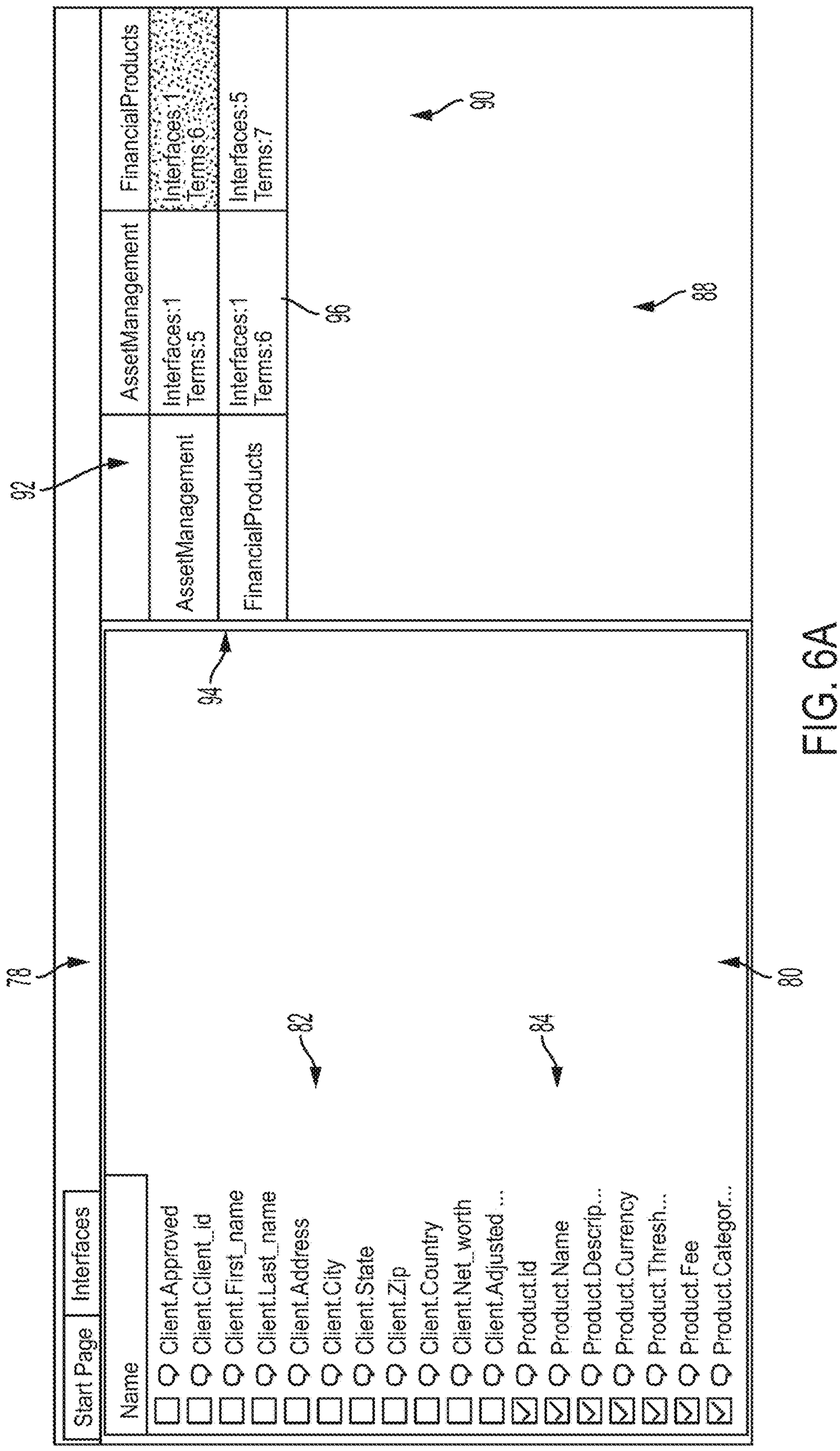
FIG. 6A is a schematic representation of a user interface generated by the system of the present invention when an operator selects one or more business terms and the system generates a matrix according to the teachings of the present invention.

FIG. 6A shows an embodiment of the present invention in which the operator is presented with a user interface in the form of window 78 that can be generated by the user interface generator 36. The window 78 can include pane elements 80 and 88. The pane element 80 can include a list 82 of all of the available business terms 84 that were identified by the term identification unit 28 in all of the software applications under analysis. The pane element 80 can be interactive and can allow the operator to open a window or pane that displays the list 82. The operator can select one or more of the displayed business terms 84 from the list 82, and in response the system, such as via the user interface generator 36 and the term lineage determination unit 34, can generate a matrix 90. The illustrated matrix 90 is displayed in the pane element 88 and can have any suitable form or arrangement, and is preferably configured as a table having columns 92 and rows 94. The illustrated matrix 90 can include any selected information, such as for example an identification of the selected software applications and associated programs that function as application interfaces. For example, the matrix 90 can show at the intersection of each row and column the number of application interfaces between the indicated applications and common business terms contained therein. In the illustrated matrix 90, the applications AssetManagement and FinancialProducts are shown and the cells 96 of the matrix 90 display the number of associated application interfaces and business terms that are associated therewith. The application interfaces indicate the number of programs that share the indicated business terms. For example, in the highlighted cell of the matrix 90, the indicated applications have a single application interface that share six business terms. That is, six business terms flow between the two applications via the indicated application interface. The cells 96 of the matrix 90 are selectable by the operator and can display additional related information.

Figure 6B:
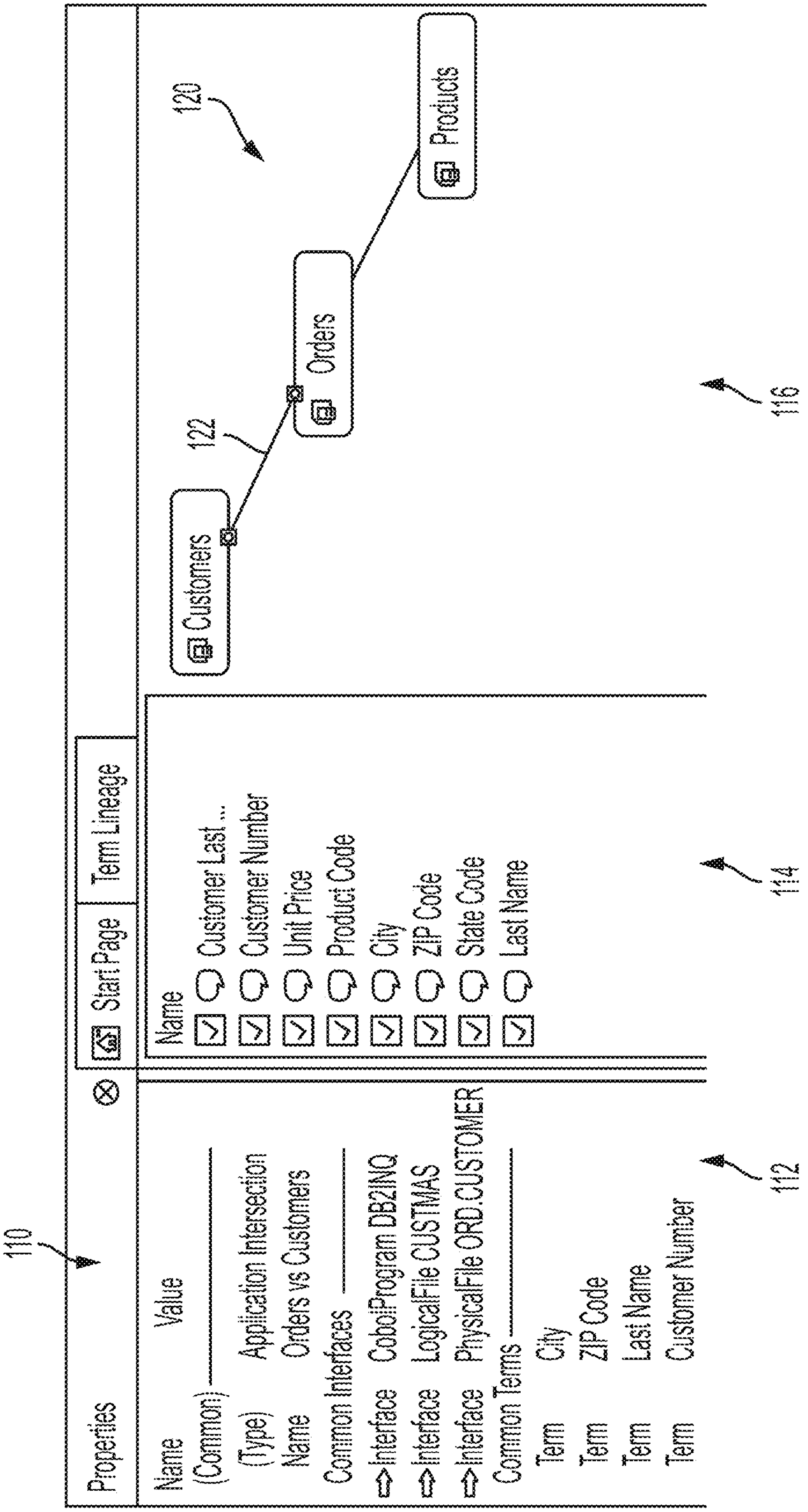
FIG. 6B is a schematic representation of a user interface generated by the system of the present invention when an operator selects one or more business terms and the system generates a diagram showing the term lineage according to the teachings of the present invention.

Alternatively, as shown for example in FIG. 6B, the user interface generator 36 can generate the illustrated window 110. The window can include pane elements 112, 114, and 116 for displaying selected information. For example, the pane element can display the common interfaces and terms between applications, and the pane element 114 can display information associated with the term lineage of one or more business terms. The pane element can display the term lineage of selected terms through a term diagram 120 rather than as a matrix 90. For instance, the illustrated term diagram 120 shows that for the selected terms there is a lineage between three applications, namely, a Customers application, an Orders application, and a Products application. Furthermore, if the user clicks on the link between the application, such as for example the link 122 between the Customers and Orders application, the system displays in the pane element 112 the business terms that flow between the applications and which serves as the interfaces though which the flows take place.

Figure 7B:
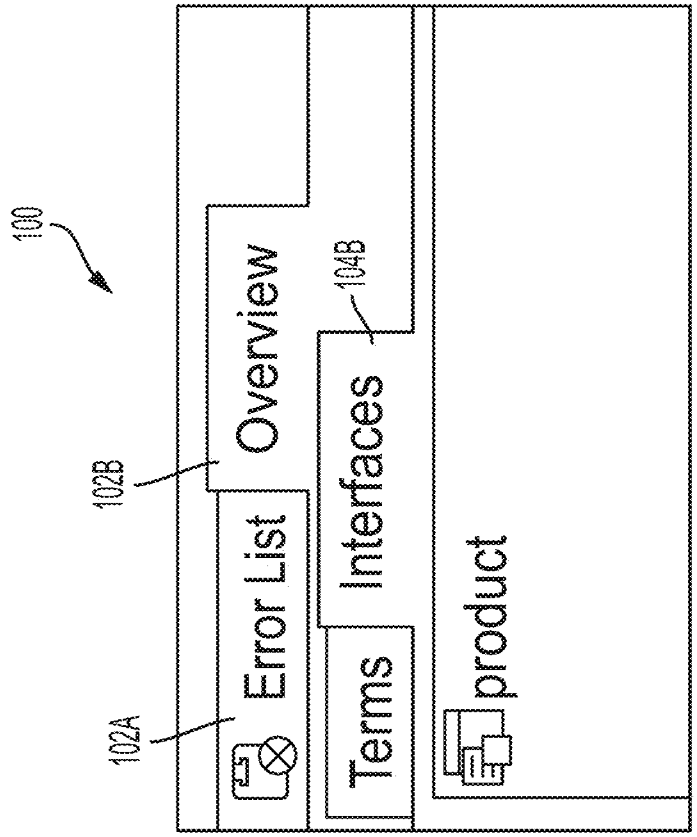
FIG. 7B is a schematic representation of a user interface displaying a list of application interfaces for selection by the operator according to the teachings of the present invention.
Figure 7A:
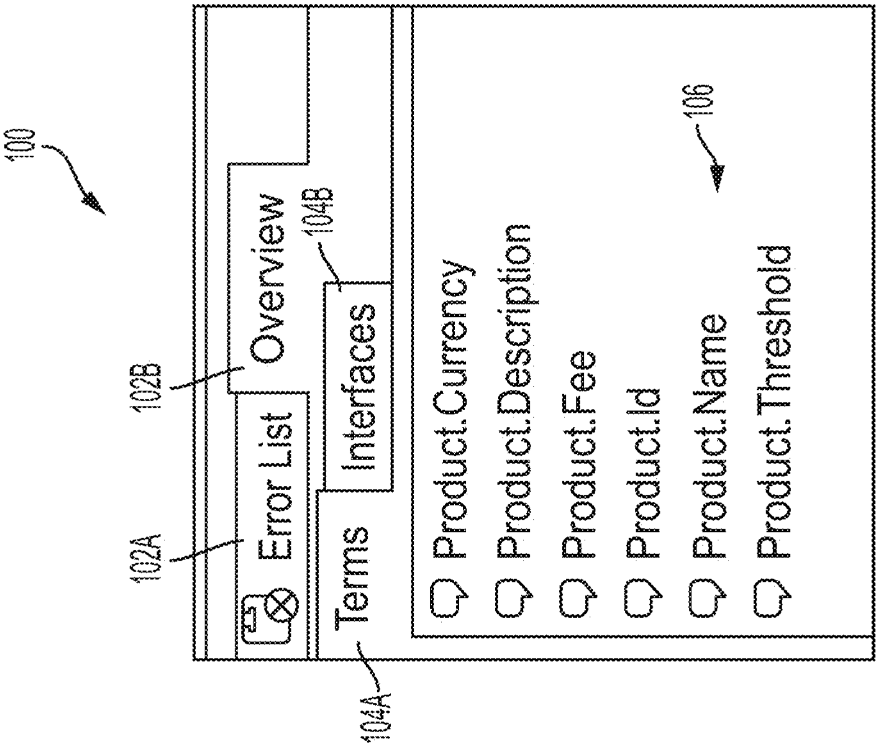
FIG. 7A is a schematic representation of a user interface displaying a list of business terms for selection by the operator according to the teachings of the present invention.

FIGS. 7A and 7B illustrate an example user interface 100 that is generated by the user interface generator 36 once the operator selects a cell 96 in the matrix 90 of FIG. 6. The user interface 100 displays the business terms flowing through the indicated software applications and the application interfaces that are associated therewith. The illustrated user interface 100 includes for example one or more user actuatable tab elements, such as for example an optional tab element 102A entitled Error List and a tab element 102B entitled Overview. When the Overview tab element 102B is selected by the operator, additional sub-tab elements can be displayed. For example, the sub-tab element 104A entitled Terms and the tab element 104B entitled Interfaces can be displayed. As shown in FIG. 7A, when the Overview tab element 102B and the Terms sub-tab element 104A are selected by the operator, a terms list 106 of business terms can be displayed to the operator. The business terms set forth in the terms list 106 are the business terms that the system 10 has identified as being passed between the applications corresponding to the selected cell 96. As shown in FIG. 7B, when the operator selects the Interfaces sub-tab element 104B, a list 108 of application interfaces is displayed. The application interfaces are the programs that are associated with the software applications corresponding to the selected rows and columns, and the business terms in the list 106 are the business terms exchanged between the applications through the application interfaces.

It is to be understood that although the invention has been described above in terms of particular embodiments, the foregoing embodiments are provided as illustrative only, and do not limit or define the scope of the invention. Various other embodiments, including but not limited to those described herein are also within the scope of the claims. For example, elements, units, tools and components described herein may be further divided into additional components or joined together to form fewer components for performing the same functions.

Any of the functions disclosed herein may be implemented using means for performing those functions. Such means include, but are not limited to, any of the components or units disclosed herein, such as the electronic or computing device components described herein.

The techniques described above and below may be implemented, for example, in hardware, one or more computer programs tangibly stored on one or more computer-readable media, firmware, or any combination thereof. The techniques described above may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which by implication or affirmatively require a computer, an electronic device, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to determine the lineage of business terms and application interfaces between multiple software applications. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed below and shown in FIG. 8 primarily for illustrative purposes and for providing or describing the operating environment of the system of the present invention. The data identification system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the illustrated electronic or computing device 300. The system 10 or any associated units or components of the system 10 can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The term lineage identification system 10 which includes the data extraction unit 14, the storage unit 18, the application model unit 24, the term identification unit 28, the mapping unit 30, the term lineage determination unit 34 and the user interface generator 36 (elements of the system) can be stored on or implemented by one or more of the electronic devices described herein (e.g., clients or servers), and the hardware associated with the electronic devices, such as the processor or CPU and memory described below.

Figure 8:
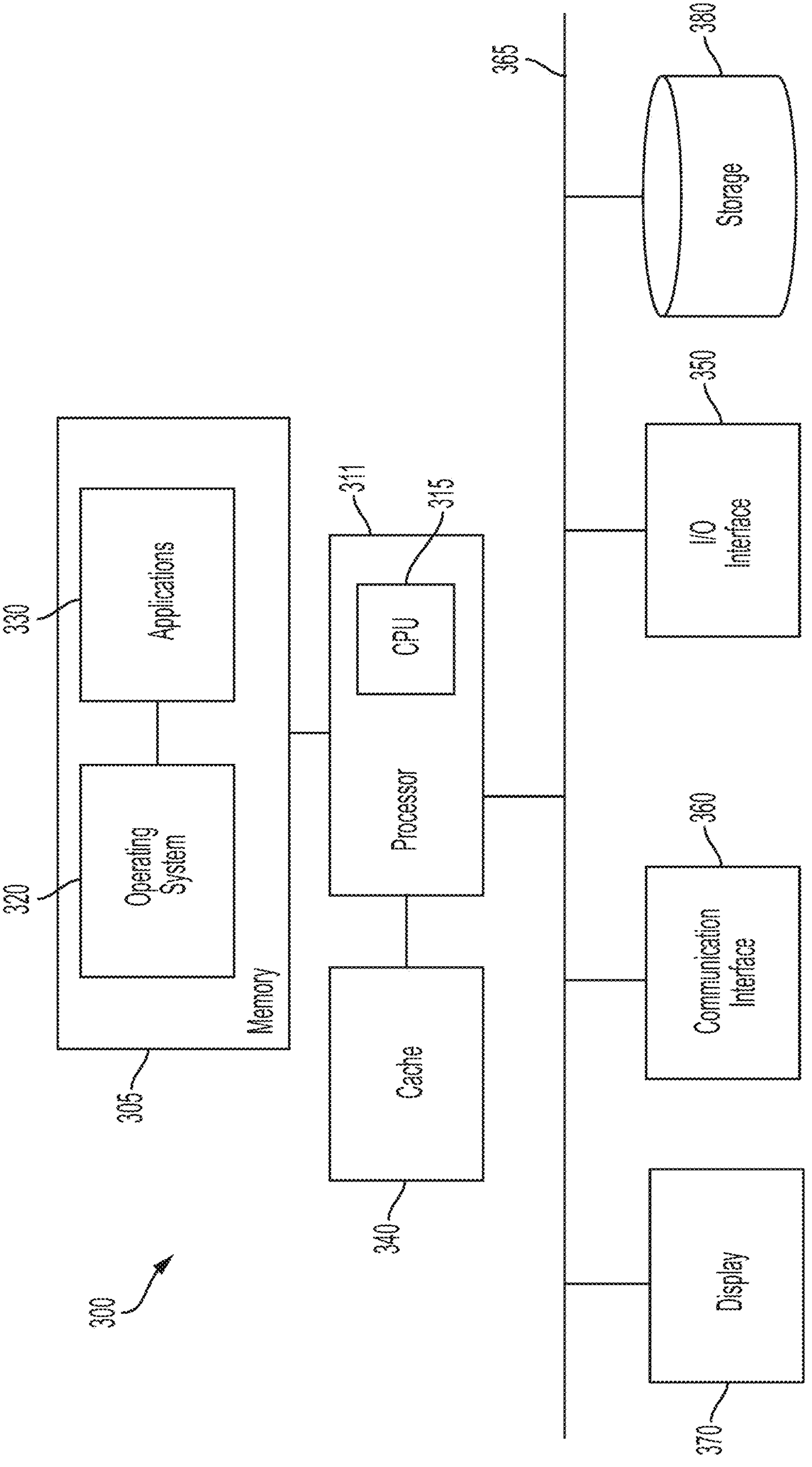
FIG. 8 is a schematic diagram of an electronic device and/or associated system suitable for implementing the process flow identification system of the present invention.

FIG. 8 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 8, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

We claim:

1. A system for determining the flow of one or more business terms between a plurality of software applications, comprising a data source for storing source code data associated with the plurality of software applications, a data extraction unit for extracting data from the source code data to form extracted data, wherein the extracted data also includes a plurality of technical artifacts, an application model unit for generating an application model that includes a representation of selected data components of the extracted data and for generating application model data from the application model, wherein the application model data includes data representative of a plurality of business terms and a plurality of technical artifacts, wherein the application model includes application interfaces for the plurality of software applications, a term identification unit for identifying the plurality of business terms from the application model data, wherein each of the plurality of business terms includes business related data, a mapping unit for mapping together in a multi-dimensional table the plurality of business terms and the plurality of technical artifacts from the application model data to form map data, and a term lineage determination unit for determining an inter-application lineage of one or more of the plurality of business terms based on the map data by tracking a flow of the one or more of the plurality of business terms from an origination application interface associated with a first software application of the plurality of software applications to a destination application interface associated with a second software application of the plurality of software applications, wherein the inter-application lineage is representative of the one or more data paths associated with one or more of the plurality of business terms flowing between the plurality of software applications, and wherein the flow of the business terms is representative of at least one of direct flow of business term data or a transformation of business term data.

2. The system of claim 1, wherein the application interfaces comprises one or more programs.

3. The system of claim 2, wherein the term identification unit identifies selected ones of the data components in the application model data, organizes the data components into a plurality of groups in which all elements of a group refer to the same concept, and associates each of the plurality of groups with one or more of the plurality of business terms.

4. The system of claim 3, wherein the mapping unit maps together the plurality of business terms with the plurality of software artifacts from the application model data that implements the business terms to establish a relationship therebetween.

5. The system of claim 4, wherein the mapping unit maps together the plurality of business terms and the plurality of software artifacts from the application model data for each of the plurality of software applications to form a map for each of the plurality of software applications.

6. The system of claim 5, wherein each one of the maps includes a table that tabulates the plurality of business terms and the plurality of software artifacts.

7. The system of claim 6, wherein the mapping unit is configured to combine the map for each of the plurality of software applications to create a combined map.

8. The system of claim 7, further comprising a storage unit for storing the extracted data and for providing the extracted data to the application model unit, wherein the storage unit comprises a database for storing the extracted data and a knowledge repository for storing selected information about the software application.

9. The system of claim 8, wherein the representation of the selected data components of the application model includes entities, relationships and associated attributes that describe a functionality of the data components in connection with each of the plurality of software applications.

10. The system of claim 9, wherein the entities include programs, classes, statements, data elements, tables, columns, or screens, and wherein the attributes include associated identifying information that further specify the entity.

11. The system of claim 10, further comprising a user interface generator for generating a user interface for displaying a list of the business terms or a list of the software artifacts that implement the business terms.

12. The system of claim 7, wherein the term lineage determination unit determines from the map data an inter-application lineage of one or more of the business terms based on the mapping between the business term data and the software object data in the map.

13. The system of claim 1, wherein the technical artifacts are shared between two or more of the plurality of software applications, and wherein the technical artifacts are designated as the application interfaces.

14. The system of claim 1, wherein the term lineage determination unit generates a matrix suitable for display on a user interface setting forth software applications and business terms, and wherein the software applications are indicative of applications functioning as the application interfaces.

* * * * *